E. P. ARMSTRONG.
GRINDING MACHINE.
APPLICATION FILED APR. 28, 1913.

1,182,615.

Patented May 9, 1916.
8 SHEETS—SHEET 2.

Fig. 2

WITNESSES:
G. B. Nissen
D. Hummer

INVENTOR:
Edward P. Armstrong.
BY
O. O. Martin.
ATTORNEY

E. P. ARMSTRONG.
GRINDING MACHINE.
APPLICATION FILED APR. 28, 1913.

1,182,615.

Patented May 9, 1916.
8 SHEETS—SHEET 3.

Fig. 3.

WITNESSES:
G. B. Nissen
D. Hummer

INVENTOR:
Edward P. Armstrong.
BY
O. Martin.
ATTORNEY

E. P. ARMSTRONG.
GRINDING MACHINE.
APPLICATION FILED APR. 28, 1913.

1,182,615.

Patented May 9, 1916.
8 SHEETS—SHEET 5.

Fig. 5.

WITNESSES:

INVENTOR
Edward P. Armstrong.
BY
O. O. Martin.
ATTORNEY

E. P. ARMSTRONG.
GRINDING MACHINE.
APPLICATION FILED APR. 28, 1913.

1,182,615.

Patented May 9, 1916.
8 SHEETS—SHEET 7.

WITNESSES:

*Fig. 7.*

INVENTOR:
Edward P. Armstrong.
BY
ATTORNEY

UNITED STATES PATENT OFFICE.

EDWARD P. ARMSTRONG, OF PORTLAND, OREGON.

GRINDING-MACHINE.

1,182,615.

Specification of Letters Patent.     Patented May 9, 1916.

Application filed April 28, 1913. Serial No. 764,269.

*To all whom it may concern:*

Be it known that I, EDWARD P. ARMSTRONG, a citizen of the United States, residing at Portland, in the county of Multnomah and State of Oregon, have invented new and useful Improvements in Grinding-Machines, of which the following is a specification.

This invention relates to grinding machines, and has particular reference to means for grinding the teeth of the type of cutting tools termed drag-saws. In machines of this character it is customary to feed the saw longitudinally relative to the grinding wheel, but as such saws are quite long, usually about eight feet, a space twice the length of the saw is required. In order to obtain perfect results a traveling frame for supporting the saw would be required, but such frame would be entirely too expensive and is therefore not commonly used. The consequence is that drag-saws cannot be uniformly ground on machines of the ordinary type, and that they therefore do not attain their highest cutting efficiency. Also that in regrinding the errors of the first grinding are apt to multiply, and that consequently considerable hand-work has to be done by expert saw grinders in order to keep a drag-saw in good cutting condition.

The object of my invention, in a broad sense, is to provide a simple and inexpensive machine embodying means for eliminating the above stated objections.

More specifically I aim to provide a machine having a stationary saw support and a traveling grinding head.

A further object is the provision of simple and efficient means for transmitting rotations, at variable speed, to the grinding wheel.

Another object is to provide means for adjusting the grinding wheel to the various grinding-angles required, without thereby interfering with the driving mechanism.

A further object is the provision of means for automatically adjusting the movement of the grinding wheel to the width of the teeth to be ground.

Finally I aim to provide improved means for feeding the grinding wheel to and from the saw in a vertical plane.

The various combinations co-acting to produce the above enumerated results, and the many advantageous features of my invention, are fully and concisely hereinafter set forth, and drawings are hereto appended in which said combinations and features are clearly illustrated.

In the drawings: Figue 1 is a front elevation of a machine embodying my invention. Fig. 2 is an end view of the machine, and Fig. 3 a plan-view. These views are drawn substantially in agreement and in order to show the general outline and operation of the machine, without paying attention to specific details.

Figure 1:
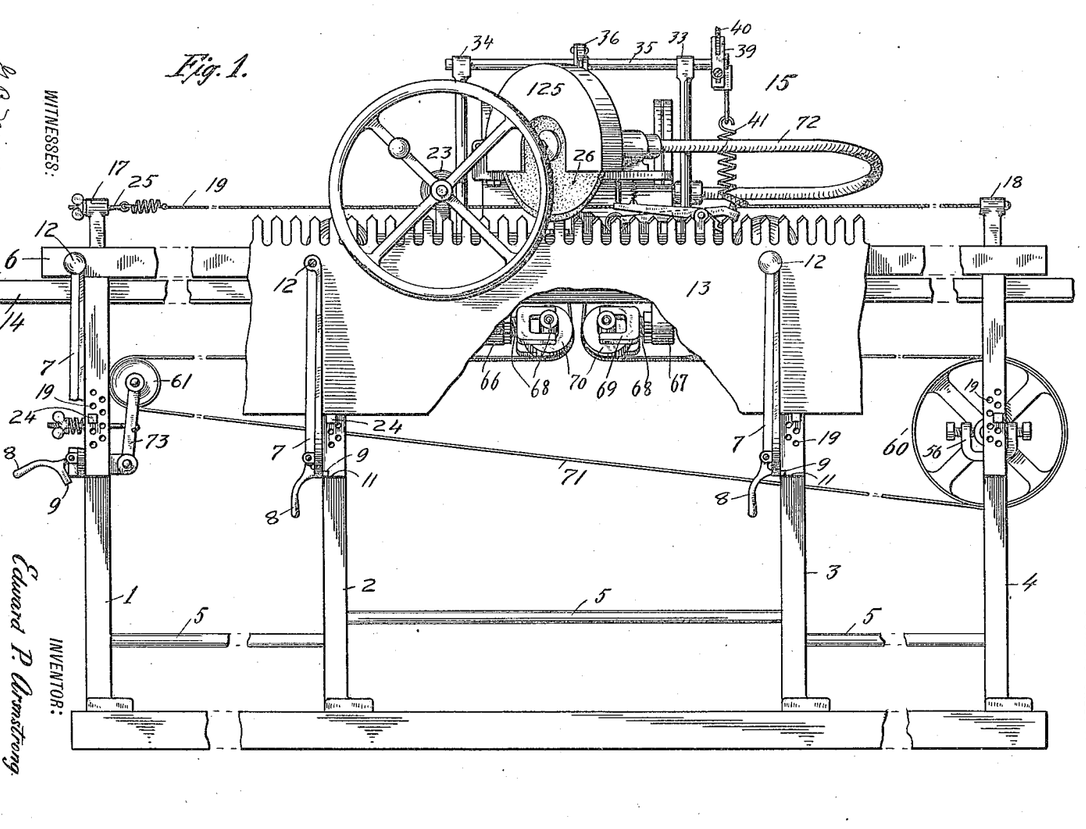

The device as a whole is mounted on a stationary frame comprising a plurality of standards 1, 2, 3, 4, and said standards are tied together in spaced alinement by suitable means, such as bolts 5 or their equivalent. The mechanism for clamping the saw in place includes a longitudinal bar 6 rigidly mounted on the upper-front corner of the standards, and a series of clamping levers 7 pivotally hung on the front portion of said standards. A pawl 8 is journaled on said levers, and said pawls are made with a projection 9 which engages the space between shoulder portions 10, 11 of the standards and the levers, thereby serving to rigidly lock the said levers in operative position. The clamping levers are furthermore perforated at the top to receive operating screws 12, by means of which the saw 13 is quickly clamped into position. Suitable means are provided for supporting the bottom edge of the saw, or more correctly its inverted top edge, and such means must be adjustable so as to accommodate saws of different width. This may be accomplished, as shown in Fig. 1, in which the standards are made with rows of perforations 19, and suitable plugs 24 are mountable in said perforations for supporting the saw. It is noticed that, when the pawls 8 are retracted, the clamping levers are free to swing on their pivots to the position shown in dotted outline in Fig. 2, thus leaving a clear path for mounting or removing the saw. On top of the standards are rigidly mounted a pair of parallel rails 14, which constitute a track on which a carriage 15, supporting the grinding head, is mounted for longitudinal movement. This carriage is preferably built to run on grooved rollers 16 in order to reduce friction and thereby to facilitate the manipulation of the carriage.

The spacing mechanism I show and aim to employ is very simple and does not interfere with the free manipulation of the machine. On the standards 1 and 4 are fixed posts 17, 18, and a cable or band 19 is suspended between said posts parallel with the travel of the carriage. On the latter are mounted standards 20 having alined perforations, in which a drum-shaft 22 is mounted to rotate, and said shaft carries on its rear end a drum 23, while a hand-wheel is affixed to its front end. The cable 19 is given one or more turns around said drum, and the carriage is moved longitudinally on its track by revolving the said hand-wheel. In order to prevent slipping of the cable 19 on the drum 23 said cable is yieldingly suspended and held under tension by means of a spring-held bolt 25.

Figure 2:
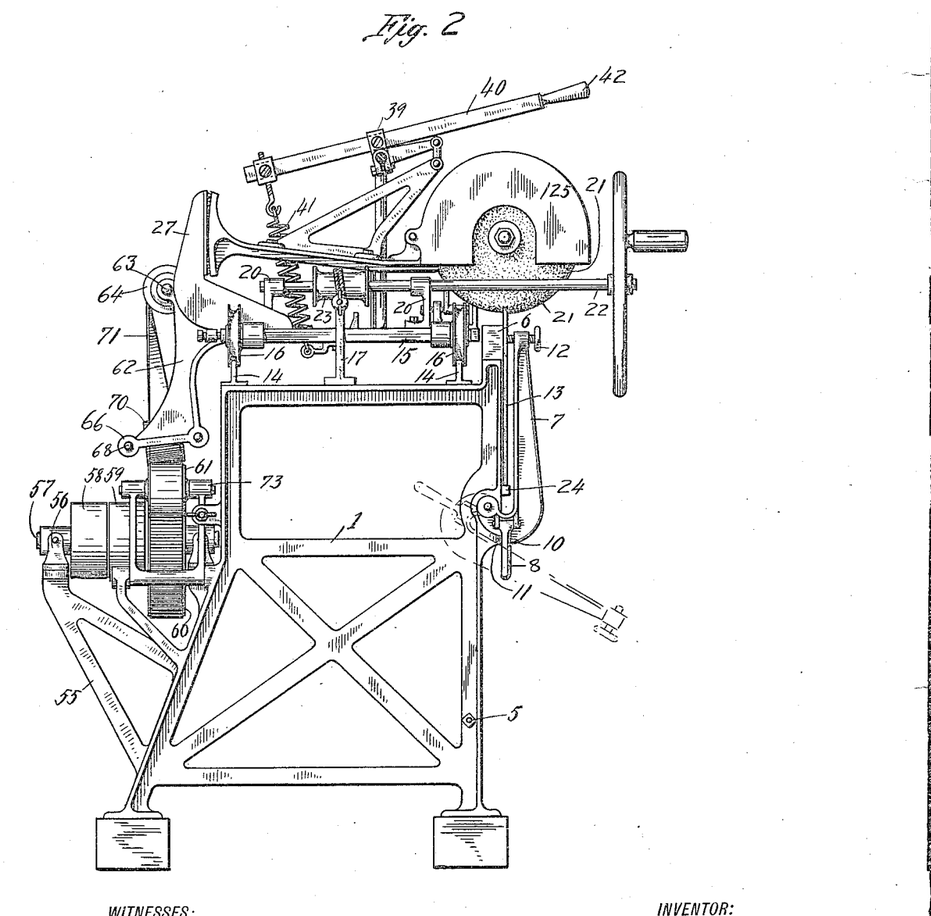
Figure 3:
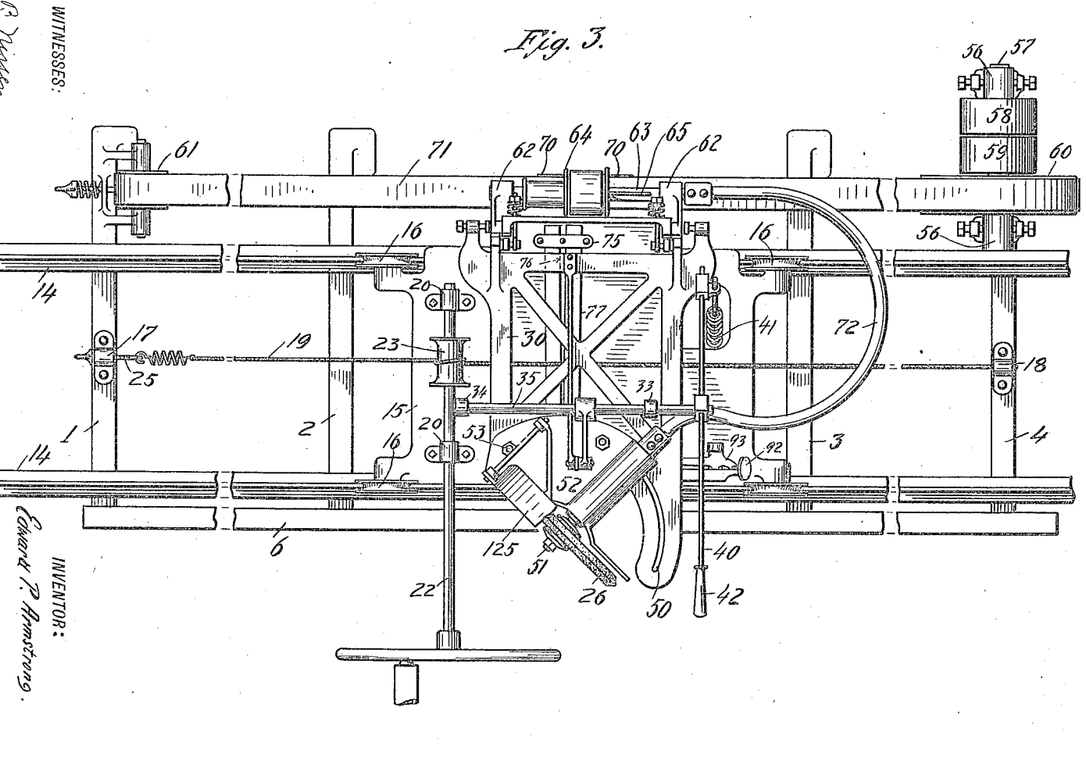
Figure 4:
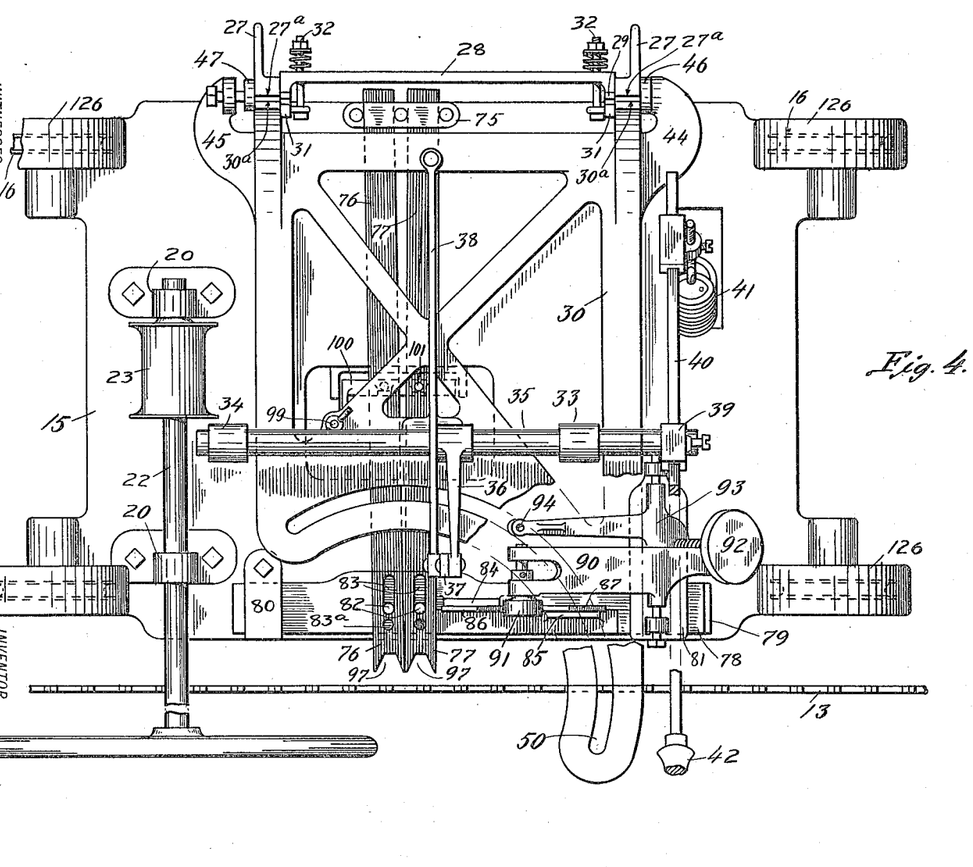
Figs. 4 and 5 are drawn on a larger scale and illustrate the traveling carriage of the machine. In these views parts are cut away and other parts shown in section for the sake of clearness.
Figure 5:
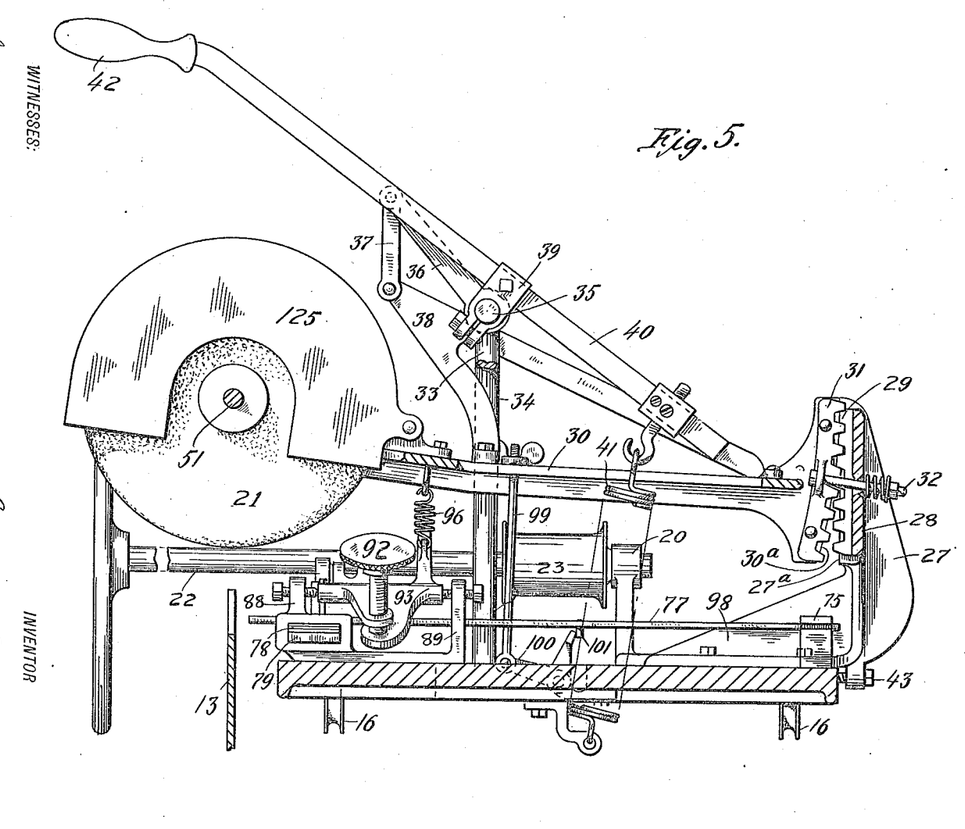

The grinding is performed by an ordinary emery or carborundum wheel. In Figs. 2 and 5 a wheel 21 is shown, said wheel having a rounded cutting edge, such as used in gumming the saw, that is to say, grinding the rounded bottoms between saw teeth. A wheel 26, having a V-shaped cutting edge, is shown in Figs. 1 and 3, and this wheel is used for grinding the beveled cutting edges on the teeth of the saw. Referring now to Figs. 4 and 5 it is seen that a pair of brackets 27 are bolted on the rear of the carriage, and each bracket has a straight and vertically disposed face 27$^a$. Between said brackets is suspended a frame 28, said frame having rack-teeth 29 adjacent to the said faces 27$^a$ and so related, that the pitch lines of said teeth coincide with the said faces. A rock-frame 30, carrying the grinding wheel 21, is mounted to engage said rack, and the operation of said frame to raise and lower the wheel will be explained later. The rear face 30$^a$ of said rock-frame is curved, and this curve forms part of a circle concentric with the grinding wheel. Segmental racks 31 are mounted adjacent to said curved faces, and the parts are so related that the teeth of the racks 29 and 31 are held in correct engagement by the faces 27$^a$ and 30$^a$. A pair of spring-held bolts are suspended between the parts and serve to retain the teeth of the racks in proper relation by drawing the faces 27$^a$, 30$^a$ together, as indicated at 32. In front of these parts, and substantially in the center of the carriage, are placed a pair of posts 33, 34, and said posts are perforated at the top to receive a longitudinally disposed rock-shaft 35. The latter carries, substantially at the center, an arm 36, which, by a link 37, is operatively connected with a fixed standard 38 of the rock frame 30. At one end of said rock-shaft is clamped a bracket 39, in which an operating lever 40 is mounted for longitudinal adjustment. Between the rear end of said lever and the carriage is suspended an adjustable spring 41, which serves to normally hold the rock-frame elevated. The front end of said operating lever terminates in a handle 42, by means of which the operator feeds the grinding wheel to the saw. Now it is seen that, as the rear face 30$^a$ of the rock-frame 30 is concentric with the grinding wheel 21, the said wheel moves in a vertical plane relative to the saw, and this is most important in order to obtain uniformity in grinding the beveled edges of the saw teeth.

It is stated above that the brackets 27 are bolted on the carriage, and suitable means, such as adjusting screws 43 (see Fig. 5) are conveniently provided for adjusting said brackets to correctly position the wheel relative to the saw, in the first instance. In Figs. 3 and 4 the rock-frame is shown provided with ears 44, 45 supporting suitable adjustable blocks 46, 47, and said blocks engage the sides of the brackets 27 for the purpose of guiding the rock frame laterally on said brackets.

In order to perform the gumming operation the round edged wheel 21 is set at right angles to the saw, as shown in Figs. 2 and 5. The carriage is moved from tooth to tooth by turning the hand-wheel, and the wheel is lowered to the proper depth between the teeth, as above described.

The second operation, that of grinding the beveled edges of the teeth, is, as stated, performed with the wheel 26 having the V-shaped cutting edge. In order to perform this operation it is necessary to turn said wheel to the correct angle relative to the saw teeth. For this purpose the front portion of the rock-frame 30 (see Figs. 3 and 4) is made with a circular perforation 50, the center of curvature of which lies in a vertical line passing through the wheel center. The grinding wheel is mounted, in the ordinary manner, on a spindle 51, and the latter is fixed to rotate in a suitable bracket 52. Said bracket is made with a series of perforations, and a corresponding series of bolts 53, extending through said perforations and the circular perforation 50 of the rock-frame serve to lock the wheel carrying bracket 52 in adjusted position.

The mechanism for rotating the grinding wheel will now be described, and for this purpose reference is invited to Figs. 1, 2 and 3.

On the standard 4 of the machine support is mounted a frame 55, provided at the top with bearing device 56, in which a counter-shaft 57 is fixed to rotate. On said shaft are mounted a loose pulley 58 and a fixed pulley 59, which pulleys connect with a prime mover in the usual, well known manner. A second fixed pulley 60 is mounted to rotate with the counter-shaft, and it is positioned in alinement with an idler 61 of the standard 1. On the rear of the carriage is bolted, or otherwise rigidly secured, a frame 62, the top of which is fitted to support a drive-shaft 63. A stepped pulley 64 is mounted to rotate with said shaft, but is free to slide longitudinally on a feather 65 of the shaft. The frame 62 is provided with pendent members 66, 67 having alined perforations in which two pairs of studs 68 are rotatably fixed. Said studs are in turn made with bifurcated heads 69 in which bearing boxes are pivotally fixed. The latter serve to support idlers 70. An endless belt 71 is hung over the several pulleys and idlers, as clearly shown in Figs. 1, 2 and 3.

Figure 8:
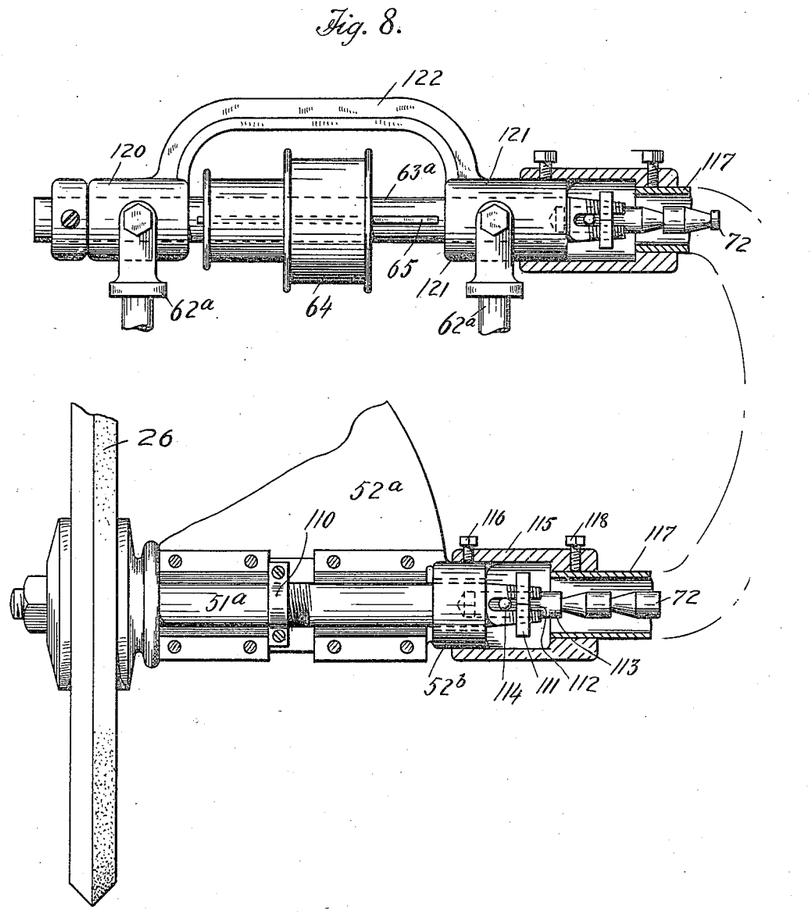
Fig. 8 shows the flexible drive mechanism detached from the machine.

The drive shaft 63 of the carriage is provided for the purpose of transmitting rotations to the spindle 51 of the grinding wheel 26, and this is readily accomplished by extending a flexible shaft 72, of any well known construction, directly from the end of the drive shaft 63 to the spindle of the grinding wheel as clearly shown in Fig. 3. The preferred means of attaching and guiding the said flexible shaft is shown in Fig. 8 and will be described later. At this point it is sufficient to note that the grinding wheel is adjustable to any desired angle within the limit of its movement, and that a flexible shaft is known to transmit motion under these conditions.

Figure 6:
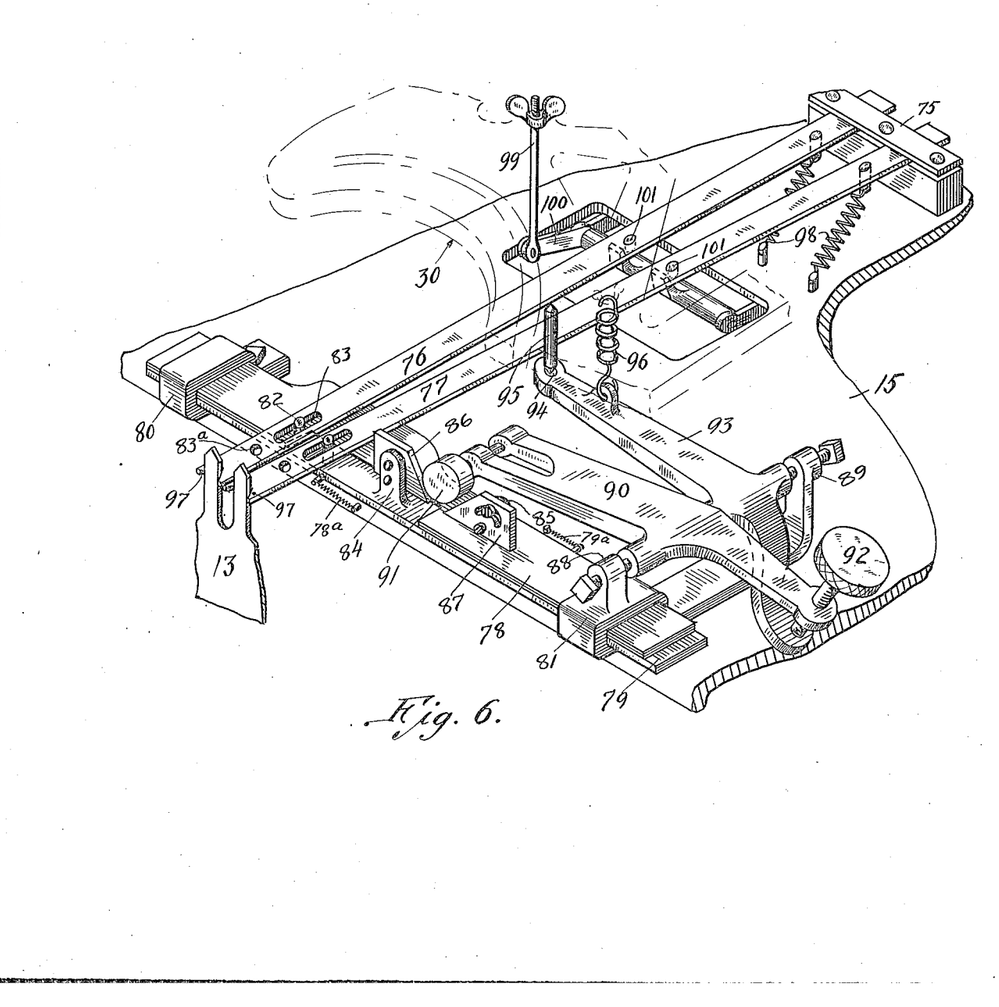
Fig. 6 is a diagrammatic view of the mechanism by means of which the carriage is correctly set relative to each saw tooth.

The carriage is at the rear provided with a suitable guide frame 75 in which a pair of gage bars 76, 77 are mounted for sliding movement. Along the front edge of the carriage are placed a pair of slides 78, 79 in suitable guides 80, 81. In each of the slides is driven a pin 82, and said pins engage elongated perforations 83 of the gage bars for the purpose of limiting the longitudinal movement of the latter. The said slides, as best shown in Fig. 6, are made with lugs 84, 85, on which a pair of adjustable cams 86, 87 are mounted.

On the guide 81 are provided a pair of posts 88, 89, between which a frame 90 is pivotally suspended. Said frame carries at one end a roller 91 and its opposite end is threaded to receive a hand-screw 92. Loosely hung on the spindle of said frame is a lever 93, the outer end of which abuts the said hand-screw 92. The inner end of the said lever is made with a socket 94, in which a pin 95 is seated, and the upper extremity of said pin lodges in a similar socket of the rock-frame 30. A suitable spring 96 is suspended between the said lever and the rock-frame for the purpose of holding said parts in spaced relation through the medium of said pin. In the front ends of the gage-bars 76, 77 are provided notches 97 having symmetrically slanting sides, and these notched ends are, by suitable springs 98, drawn into engagement with two adjacent teeth of the saw, as shown in Fig. 6. The operator grips the handle 42 and lowers the rock-frame 30, thereby positioning the grinding wheel between a pair of saw teeth, as best shown in Fig. 1. He then grips the hand-wheel with his left hand and moves the carriage to the right. Now, as the gage bars 76, 77 are firmly locked in the teeth of the saw, and as the slides 78, 79 are locked in engagement with said bars, through the medium of the pins 82, it is evident that said guides must remain substantially stationary during this movement of the carriage. The roller 91 is thus caused to travel on the beveled edge of the cam 87, thereby tilting the frame 90, and in turn raising the rock-frame 30, whereby the grinding wheel is caused to grind the beveled edge of one of the teeth.

It is noticed than an adjustable rod 99 connects the rock-frame 30 with a bell crank 100 of the carriage, and this bell crank, in turn, is positioned to engage pendent studs 101 of the gage bars 76, 77. The moment the operator releases the pressure on the handle 42, the rock frame 30 rises, as hereinbefore described, and in thus rising it raises the rod 99, which in turn swings the bell crank 100, and the latter draws the gage bars 76, 77 rearwardly out of engagement with the teeth of the saw, against the tension of their springs 98. He then moves the carriage to a position of registration with the next tooth to be operated upon and repeats the performance. In order to grind the opposite bevel on the saw teeth the grinding wheel is reversed, and the carriage moved step by step in the opposite direction between each grinding operation.

Figure 7:
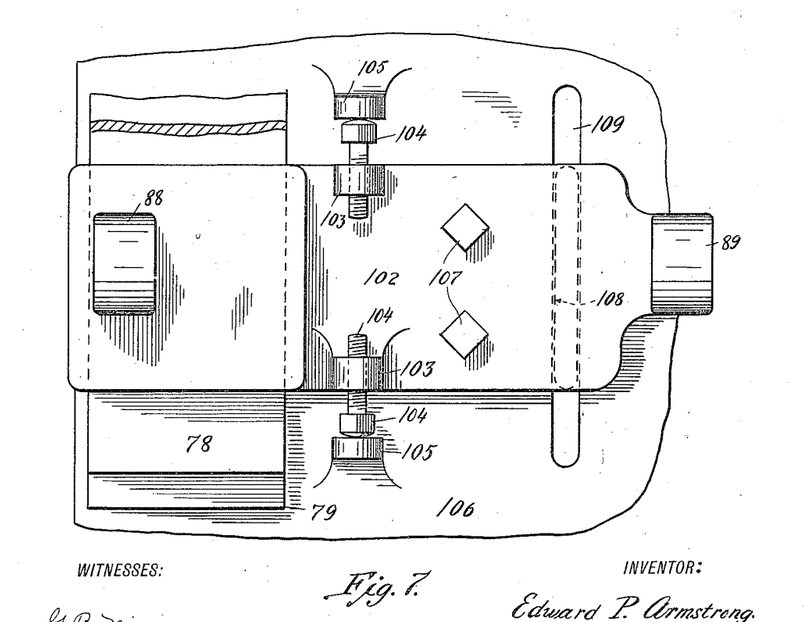
Fig. 7 illustrates means for adjusting certain portions of the above setting mechanism.

As stated, the cams 86, 87 are adjustably fixed on the lugs 84, 85, and in addition the guide 81 may conveniently be adjusted so as to position the roller 91 relative to said cams. A means of adjustment is shown in Fig. 7. On the guide frame 102 are provided a pair of lugs 103 in which adjusting screws 104 are mounted. The heads of the latter abut bosses 105 of the carriage 106. By means of said screws 104 the necessary adjustment is readily effected, and the guide fixed in position by a series of bolts 107. Means should be provided for retaining the guide 102 in alinement, and such means may conveniently take the shape of a feather 108 of the guide positioned to slide in a perforation 109 of the carriage.

From the foregoing explanation it is understood that the gage bars 76, 77 are urged into engagement with the saw teeth, and that they thereby adjust the slides 78, 79 correctly for grinding the teeth. Suitable springs 78ª 79ª, suspended between the slides and the top of the carriage, serve to return said slides to central position, or correct position relative to the grinding wheel center, when the said gages are withdrawn.

Any one versed in the art will know that it is required, in order to successfully employ a flexible drive shaft, to connect the ends of said shaft in such a manner that cramping of the shaft at its ends is avoided. This is accomplished substantially as shown in Fig. 8.

The spindle 51ª of the wheel 26 is made with a threaded portion, and the bearing bracket 52ª is cut open at this place so as to gain access to said threaded portion. A removable nut 110 is securely clamped on the said threaded portion of the spindle, and is provided in order to prevent longitudinal displacement of the spindle. The inner end of the spindle terminates in a tapered portion having screw-threads on which a threaded nut 111 is mounted. In the end of the spindle is provided a bore and a transverse slot 112. The end-link of the flexible shaft is made with a cylindrical shank 113 fitting said bore, and a pin 114 is transversely fixed in said shank. The latter is first inserted into the spindle and the nut screwed up tight, thereby firmly anchoring the flexible shaft in place.

The inner end of the spindle bearing is made with an integral sleeve 52ᵇ, and the bore of said sleeve is made somewhat larger than the spindle in order to conveniently place the spindle in the bearing without removing the nut 110. A perforated cap 115 is applied to said sleeve and securely fixed by suitable means, as one or more set-screws 116. The inner end of said cap is bored large enough to receive the cover 117 of the flexible shaft, which cover then is firmly clamped in place by a set-screw 118, or its equivalent. The drive shaft 63ª is constructed in a very similar manner to receive the other end of the flexible shaft. The bearings 62 of this drive shaft have hereinbefore been shown integral with their supporting brackets, for the sake of simplifying the description. It is, however, common practice to provide floating bearings for a drive shaft, and such bearings are indicated in Fig. 8.

Suitable boxes 120, 121 are pivotally fixed in the brackets 62ª, and said boxes are rigidly combined by a brace 122. The boxes carrying the drive shaft may thus readily be removed and re-babbitted, and the proper alining of the stepped pulley 64 quickly effected.

It is noticed that the grinding wheel is provided with a hinged cover 125, and by referring to Fig. 4 it is seen that the grooved rollers 16 of the carriage are shown protected by suitable covers 126. It is evident that all the important moving parts of the machine must be similarly covered in order to protect such parts against emery dust expelled from the grinding wheel and settling on the machine, but such further protecting devices are not shown as they would necessarily complicate the drawings.

Referring now to Fig. 4 it will be seen that the gage-bars 76, 77 are detachably placed. In order to remove said bars, they are lifted off the pins 82 and forced rearwardly until the perforations 83ª register with the pins 82, which pins, engaging the latter perforations are then employed for holding the gage-bars retracted against the tension of their springs 98. The said bars are thus held retracted in order to clear the grinding wheel during the gumming operation.

Figure 9:
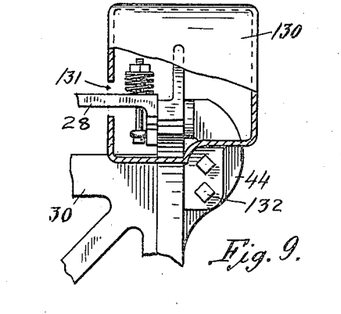
Figs. 9 and 10 show certain devices provided for protecting the important parts of the machine.
Figure 10:
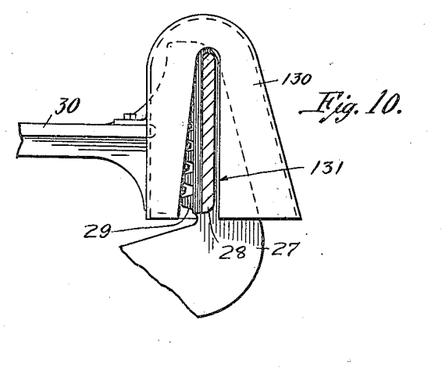

In Figs. 9 and 10 is shown a hood for covering the rear extremities of the rock-frame 30 and the upper extremity of each bracket 27. This hood, 130, is made with a vertical slit 131 through which the frame 28 extends. It is also cut out in front to straddle the segmental rear-portion of the rock frame 30, and it is secured to said rock frame by suitable bolts 132, or their equivalent. The said hoods are provided, not only in order to protect against emery dust, but also to protect the operator and in order to prevent hand-tools, or the like, from dropping into the meshing teeth.

I claim:

1. A grinding machine having a stationary work support and a traveling carriage, a counter shaft on said carriage, an endless belt hung on said support and connected to rotate said countershaft, co-acting means for varying the speed of said counter shaft, a grinding member rotatably fixed on said carriage, and flexible means interconnecting said grinding wheel and said counter shaft.

2. A grinding machine having a stationary work support and a traveling carriage, a counter shaft on said carriage, a stepped pulley on said shaft, a driven pulley and a spring-held idler on said support, idlers on said carriage, an endless belt interconnecting said pulleys and idlers, the devices arranged to transmit rotation to said counter shaft at variable speed, the speed changes obtained by shifting the belt on the stepped pulley against the tension of the spring of said idler.

3. In a grinding machine, a driving mechanism comprising a driven pulley and a yieldingly hung idler on the stationary work support, a counter shaft on the traveling carriage, a stepped pulley mounted to rotate said shaft and longitudinally slidable on the shaft, a pair of guide pulleys on the carriage, an endless belt hung on said drive pulley and idler and bent over said guide pulleys to the said stepped pulley, the devices arranged to shift said belt on said stepped pulley in order to effect speed changes, the belt permitted, through the medium of said yielding idler, to be drawn from step to step on said stepped pulley, and the latter being slidably fixed in order to maintain its position of alinement.

4. In a grinding machine, a supporting frame, a rock-frame, a grinding wheel on said rock-frame and adjustable on said rock-frame to angular positions relative to the work on said frame, resilient means for holding said frame elevated, coöperating means for tilting the frame, coöperating means for retaining said grinding wheel in vertical relation during said tilting movement, and means for transmitting rotations from driving members on said support to said grinding wheel.

5. In a saw grinding machine having vertical surfaces, a rock-frame, a grinding wheel on said rock-frame, said rock-frame having curved surfaces eccentric with said wheel and abutting the said vertical surfaces, means for controlling the relations between said surfaces during the movement of the rock-frame, and means for operatively supporting said rock-frame, the device co-acting to move said grinding wheel in a vertical plane, and said grinding wheel being adjustably fixed on the rock-frame.

6. In a grinding machine, a work support, a rock-frame, a grinding wheel on said rock-frame and adjustable on said rock-frame to angular positions relative to the work on said support, resilient means for holding said frame elevated, coöperating means for tilting the frame, coöperating means for retaining said grinding wheel in vertical relation during said tilting movement, and means for transmitting rotations from driving member on said support to said grinding wheel, said means including a flexible shaft.

7. In a saw grinding machine having vertical surfaces, a rock-frame, a grinding wheel on said rock-frame, said rock-frame having curved surfaces concentric with said wheel and abutting the said vertical surfaces, means for controlling the relations between said surfaces during the movement of the rock-frame, posts on the machine, a rock-shaft hung in said posts, a spring-held hand lever fixed to rock said shaft and connections between said shaft and the said rock-frame, the devices co-acting to move said grinding wheel in a vertical plane, and said grinding wheel being adjustably fixed on the rock-frame.

8. In a grinding machine, a rock-frame, a grinding wheel on said frame, means for feeding said wheel vertically relative to the saw, means for controlling the vertical movement of the wheel, said means including gages engaging the teeth of the saw, cams adjusted by said gages, and devices operating on said cams to raise and lower the said wheel.

9. In a grinding machine, a stationary saw support, a carriage movable parallel with the saw to be ground, a rock frame on said carriage, a grinding wheel on said rock-frame, coöperating means on the carriage and rock-frame for moving the said wheel vertically, gage bars on said carriage for engagement with the saw-teeth to be ground, cams adjusted by said gage bars, and connecting devices operating on said cams to move said wheel vertically during the movement of the carriage.

10. In a saw grinder, a rock-frame, a grinding wheel on the rock-frame, means for moving said wheel in a vertical plane, gages mounted to slide transversely, means for yieldingly urging said gages into engagement with the saw-teeth to be ground, cams adjusted by said gages in relation to said saw-teeth, an oscillating frame having a roller engaging said cams, and connecting means between said oscillating frame and the said rock-frame.

11. In a grinding-machine, a saw-support, a rock-frame, a grinding wheel on the rock-frame, spring-held means for feeding said wheel vertically to the saw, means engaging and adjusted by the adjacent teeth to be ground for controlling the vertical movement of the grinding wheel during the grinding operation, and coöperating means for withdrawing said controlling means from engagement with the saw-teeth when the grinding wheel is raised after the grinding operation.

12. In a grinding machine, a saw support, a grinding wheel on the rock-frame, gages on the machine urged by springs into engagement with the teeth to be ground, means adjusted by said gages for controlling the perpendicular movement of the grinding wheel during the grinding operation, and adjustable devices on the rock-frame and acting upon said gages when the rock-frame rises after each grinding operation to withdraw said gages from the saw-teeth.

13. In a saw grinding machine, a rock-frame, a grinding wheel on said frame adjustable to angular positions relative to the saw, gages on the machine urged into engagement with the adjacent saw-teeth to be ground, cams adjusted by the position of said gages and held locked with the gages against longitudinal movement, devices on the rock-frame and operating on said cams to control the vertical movement of the rock-frame during the operation of the machine, and means on said rock-frame engaging said gages for the purpose of withdrawing the latter from the saw-teeth when the rock-frame rises after each grinding operation.

14. In a grinding machine, a saw support, a rock-frame, a grinding wheel on the rock-frame, gages on the machine urged by springs into engagement with the teeth to be ground, means adjusted by said gages for controlling the vertical movement of the grinding wheel during the grinding operation, adjustable devices upon said gages when the rock-frame rises after each grinding operation to withdraw said gages from the saw teeth, and means for locking said gages in withdrawn position.

15. In a grinding machine, a rock frame, a grinding wheel on the rock-frame, gage bars transversely slidable on the carriage and yieldingly urged toward the saw, said gage bars having notched ends for engagement with the saw teeth to be ground, cams operatively connected with said bars for adjustment relative to the saw teeth; and devices operating on said cams to control the movement of the grinding wheel to the saw-teeth during the grinding operation.

16. In a grinding machine, a rock-frame, a grinding wheel, means on the machine for engagement with two adjacent teeth to be ground for the purpose of gaging the width of said teeth and the space between the teeth, means set by said gaging means for the purpose of controlling the movement of the grinding wheel, and connecting devices coöperating with said controlling means for effecting said movement.

17. In a grinding machine, a saw support, a rock-frame and a grinding wheel on said rock-frame, in combination with transverse gage bars on the machine having notched ends for engagement with the two adjacent teeth of the saw to be ground, longitudinal slides operatively connected with said bars, cams on said slides, and connecting means operating on said cams to control the movement of said rock-frame, the devices arranged to space said cams so as to grind said teeth centrally and to uniform height irrespective of the width of each tooth and the width of the spaces between the teeth.

18. In a device of the character described, gaging means engaging two adjacent saw-teeth and thereby held stationary during the grinding movement of the device, cams adjustable by said gaging means, and devices operating on said cams for raising and lowering the grinding wheel during the grinding operation, the devices co-acting to grind the teeth of a saw centrally and to uniform height irrespective of variation in the width of teeth and tooth spaces.

19. In a saw grinder, gaging means for engaging with two adjacent saw teeth; controlling devices movable by said gaging means; the said gaging means operating to set the said controlling devices to correspond with the center of each tooth irrespective of the variations in the teeth; and connecting means operating on said controlling devices to direct the movement of the grinding wheel to grind said teeth centrally and to a uniform height.

20. In a saw grinder, gage bars for engagement with two adjacent teeth; slides set by said gage bars; adjustable cams on said slides; and an oscillating frame having a roller operating on said cams to raise and lower the grinding member; the devices co-acting to grind the saw teeth centrally and to uniform height irrespective of variations in the width of the teeth and tooth spaces.

21. In a device of the character described gage bars yieldingly urged into engagement with two adjacent teeth, slides set by said bars to positions relative to the tooth centers, cams on said slides, said cams adjustable to make up for irregularities in the operation of the machine, an oscillating frame operating on said cams to control the movement of the grinding wheel, and means for adjusting said oscillating frame to correspond with said cams.

22. A saw grinder having perpendicular surfaces, a rock-frame, a grinding member mounted to rotate on said rock-frame, the rear end of said rock-frame having curved faces concentric with said grinding member and abutting said vertical surfaces, resilient means for retaining said faces in engagement, inter-meshing gear-teeth on the vertical faces and rock-frame controlling the relative movement of said faces, and means for covering the said mechanisms between the carriage and the rock frame.

In testimony whereof I have hereunto affixed my signature.

EDWARD P. ARMSTRONG.

Witnesses:
G. BLAINE NISSEN,
D. HUMMER.